July 15, 1924.                                                              1,501,589
H. J. FERRIS
BRAKE FOR COASTER WAGONS
Filed Oct. 22, 1923
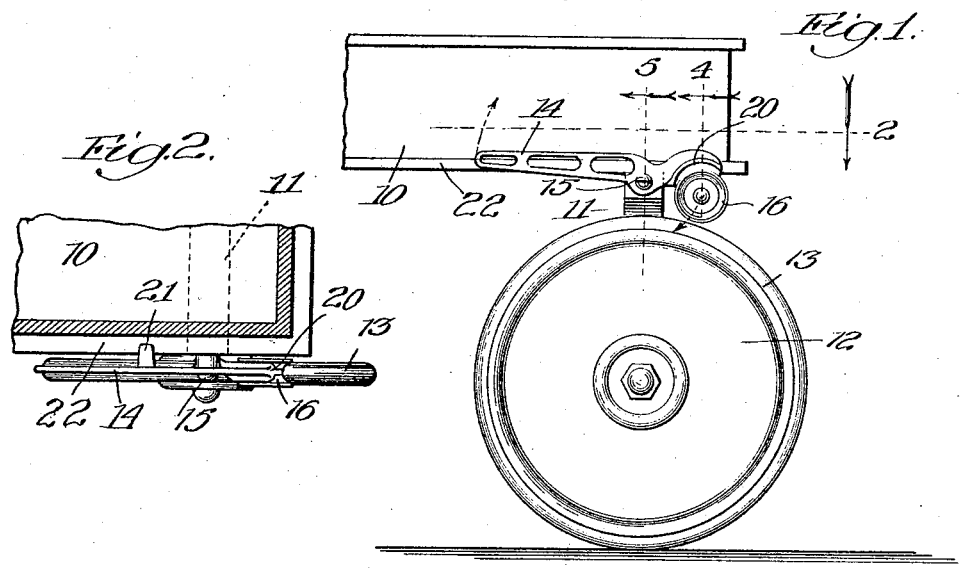
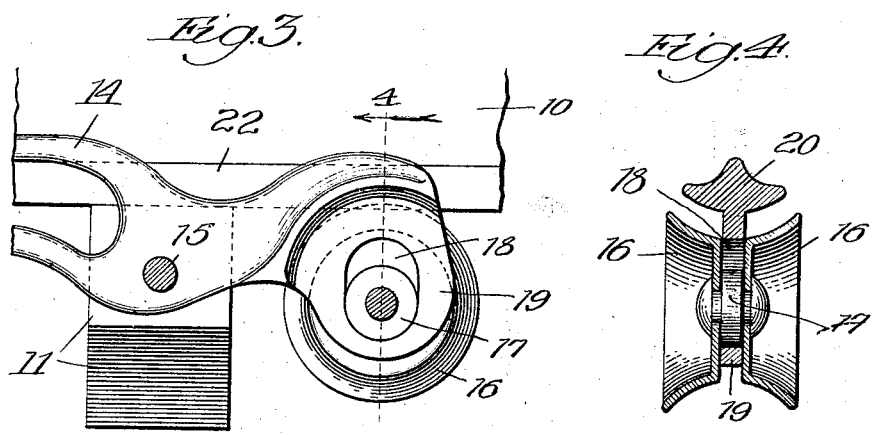
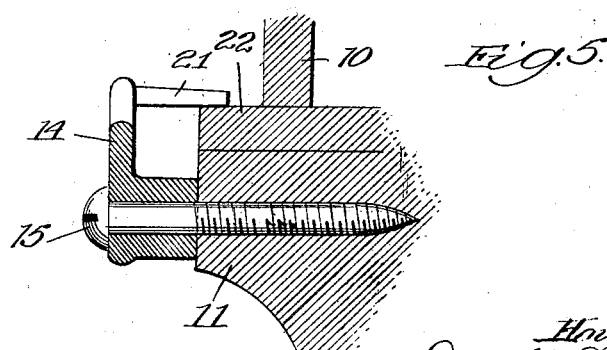

Patented July 15, 1924.

1,501,589

UNITED STATES PATENT OFFICE.

HOWARD J. FERRIS, OF HARVARD, ILLINOIS, ASSIGNOR TO HUNT-HELM-FERRIS & COMPANY, OF HARVARD, ILLINOIS, A CORPORATION OF ILLINOIS.

BRAKE FOR COASTER WAGONS.

Application filed October 22, 1923. Serial No. 670,045.

*To all whom it may concern:*

Be it known that I, HOWARD J. FERRIS, a citizen of the United States, residing at Harvard, in the county of McHenry and State of Illinois, have invented a new and useful Improvement in Brakes for Coaster Wagons, of which the following is a specification.

This invention relates to brakes for coaster wagons and the like.

The brakes heretofore used on coaster wagons which were usually equipped with wheels having iron rims were found to be inadequate when applied to rubber tired wheels for the reason that the brake previously employed used a front shoe which bore directly against the tire, and in the case of rubber tires caused continuous wear and abrasion of the tire.

The primary object of the present invention is to provide a satisfactory brake for rubber tired wheels which will produce a good braking action, but which at the same time will not tend to injure the surface of the tires.

This and other objects have been accomplished by this invention which is fully described in the following specification and shown in the accompanying drawings in which:

Figure 1 is a side elevation of the rear end of a coaster wagon equipped with my brake;

Fig. 2 is a partial horizontal section on the line 2 of Fig. 1;

Fig. 3 is an enlarged partial side elevation of the brake lever with one of the wheels removed;

Fig 4. is a vertical section on the line 4 of Figs. 1 and 3; and

Fig. 5 is an enlarged section on the line 5 of Fig. 1.

The embodiment illustrated comprises a coaster wagon having a box 10 supported at its rear end upon a support 11 which carries an axle upon which rear wheels 12 are suitably journaled. These wheels are preferably provided with rubber tires A brake lever 14 is hingedly mounted by means of a screw 15 upon the outer end of the support 11. The facing cup-like wheels 16 (Fig 4) are secured together in axial alignment by means of a shouldered rivet 17. The shouldered portion of this rivet passes loosely through a slot 18 in the rear end of the rib 19 of lever 14, said end being narrowed so as to permit it to pass freely between the cup-shaped wheels 16.

The wheels 16 lie immediately over the tire 13 and are held out of contact therewith by the weight of the lever 14 which normally remains in the position shown in Fig. 1. These wheels are formed so as to accurately fit the rubber tire 13, and above them is a curved shouldered portion 20, it likewise is formed to fit the curved wheels 16. The lever 14 is normally held at the position shown by means of a lug 21 which rests upon a ledge 22 on the wagon body.

It will be apparent from the foregoing that as the brake lever 14 is raised the brake wheels will be lowered into contact with the tire 13 and that as the brake lever 14 is further raised, the curved ribbed portion 20 will be brought to bear upon the upper curved surfaces of the brake wheels 16, thereby applying the brake to them as they are rotated by contact with the tires 13. The braking action is thus transferred from a direct friction between the brake and the tire to friction between the brake wheels and the shouldered portion 20, the braking wheels 16 thus having largely a rolling contact with the tires 13.

While I have shown and described but a single embodiment of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. A brake for rubber tired wheels comprising a lever, a roller curved to fit the periphery of said wheel and rotatably mounted on said lever, a shoulder on said lever adapted to bear against said roller on the opposite side from said wheel, a rib on said lever, said roller being made of two parts lying one on each side of the rib, and a shaft passing through said rib and carrying said roller parts.

2. A brake for rubber tired wheels comprising a lever, a roller curved to fit the periphery of said wheel and rotatably mounted on said lever, a shoulder on said lever adapted to bear against said roller on the opposite side from said wheel, a rib on said lever, said roller being made of two parts lying one on each side of the rib, and a shaft passing through said rib and carrying said roller parts, said shoulder extending on each side of said rib and being formed to substantially fit said roller parts.

3. A brake for rubber tired wheels comprising an operating member movable toward and from said wheel, a rib on said member, a slot in said rib extending toward said wheel, a roller made up of two facing roller members lying one on each side of said rib, a shaft connecting said roller members rotatably and slidably mounted in said slot, and shoulders on said members adapted to engage said roller members when they are forced against said wheel by the operating member.

HOWARD J. FERRIS.